Patented July 18, 1939

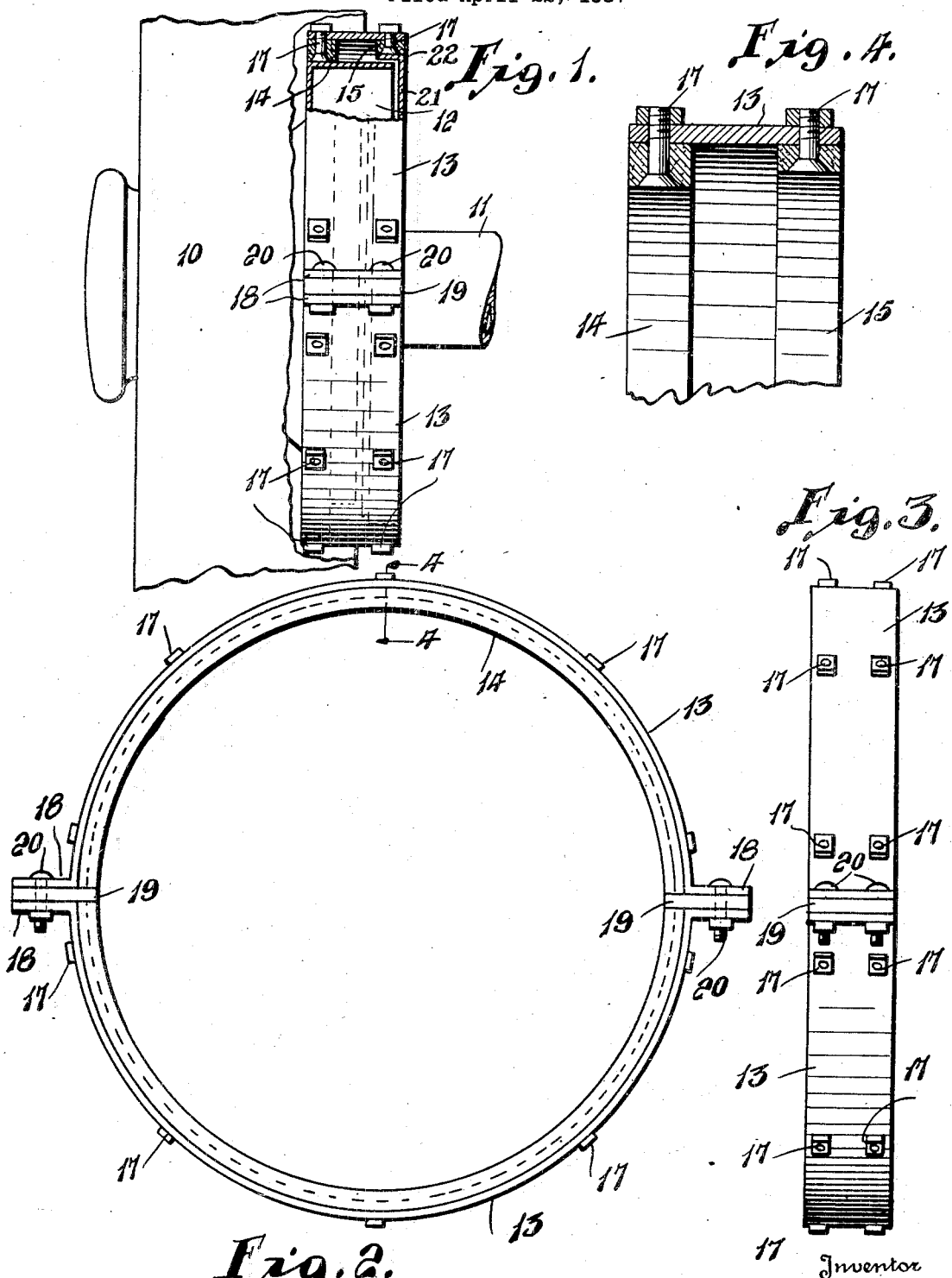

2,166,882

UNITED STATES PATENT OFFICE 2,166,882

HOUSING AND HUB BAND FOR CARS

Columbus C. Wallace, Fort Henry, Tenn.

Application April 22, 1937, Serial No. 138,435

3 Claims. (Cl. 188—2)

This invention relates to a band or attachment adapted to surround the brake drum of an automobile or equivalent wheel, in order to exclude foreign matter such as mud, water and also so as to aid in preventing wear and loosening, aid the wheel in running in a true circle, preventing undue wear of the bushing of the differential gear and loosening thereof, aid in keeping the axle in the rear housing from loose motion and aid in preventing loose motion at the hub of the car.

It is also aimed to provide an exceedingly simple structure capable of expeditious attachment to existing automobile wheels and particularly those of Ford V-8 automobiles.

The more specific objects and advantages will become apparent from a consideration of the description following taken in connection with accompanying drawing illustrating an operative embodiment.

In said drawing:

Figure 1 is a view fragmentary in nature, partly in section and partly in elevation showing the band as applied to a vehicle wheel;

Figure 2 is an elevation of the band alone taken at a right angle to Figure 1;

Figure 3 is an edge elevation of the band; and

Figure 4 is a cross sectional view taken on the line 4—4 of Figure 2.

Referring specifically to the drawing, 10 designates a conventional automobile wheel driven by or mounted loosely on an axle 11 according to whether or not it is a driving wheel or steering wheel. A conventional brake drum 12 is associated with the wheel 10. My improvements surround the drum 12 so as to effectively close the exposed space between the same and part relatively to which it moves, that is conventional backing plate 21, so as to exclude foreign matter, and aid in minimizing wear and otherwise accomplishing the various objects above enumerated.

In carrying the invention into effect, substantially semi-circular bands or sections of metal are provided at 13 and they carry on their inner curved surfaces, spaced apart annular ribs 14 and 15, the former being of greater thickness or radial extent than the latter. Such ribs or auxiliary bands 14 and 15 may be secured to the band sections 13 in any suitable way. They may be metallic, of a rubber composition or other gasket material and be riveted or removably bolted as at 17 to the band sections.

Said band sections 13 have laterally extending flanges 18 at their ends, and rubber or other yielding blocks 19 are interposed between the same and bolts 20 are removably passed through the flanges 18 and blocks 19.

By reason of the construction described, the sections are removably and tightly clamped to the backing plate 21, specifically to the usual flange 22 thereof, so as to surround the housing 12, through the tightening of the bolts 20, excluding foreign matter from the space between the drum and the flange 22 relatively to which the same moves, in order to protect all elements or parts enclosed by the drum and to otherwise accomplish the results mentioned.

Various changes may be resorted to within the spirit and scope of the invention.

I claim as my invention:

1. In combination with an automobile wheel structure having a brake drum, a backing plate and band device comprising a band adapted to encircle the brake drum, said band on its inner surface having spaced apart ribs, each of said ribs extending toward the axis of the band, one of said ribs extending toward said axis farther than the other rib.

2. In combination with an automobile wheel structure having a brake drum, a backing plate and band device comprising a band adapted to encircle the brake drum, said band on its inner surface having spaced apart ribs, each of said ribs extending toward the axis of the band, one of said ribs extending toward said axis farther than the other rib, said band being in sections, and means to clamp the sections together and to said backing plate and around said drum.

3. In combination with an automobile wheel structure having a brake drum, a backing plate and band device comprising a band adapted to encircle the brake drum, said band on its inner surface having spaced apart ribs, each of said ribs extending toward the axis of the band, one of said ribs extending toward said axis farther than the other rib, said band being in sections, means to clamp the sections together and to said backing plate and around said drum, comprising outwardly extending flanges on the sections, flexible elements between the flanges, and bolts extending through the flanges and flexible elements.

COLUMBUS C. WALLACE.